(12) United States Patent
Choi

(10) Patent No.: US 7,996,865 B2
(45) Date of Patent: Aug. 9, 2011

(54) METHOD FOR PROVIDING PROGRAM GUIDES AND IMAGE DISPLAY APPARATUS USING THE SAME

(75) Inventor: Seok-chool Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 615 days.

(21) Appl. No.: 11/790,550

(22) Filed: Apr. 26, 2007

(65) Prior Publication Data

US 2008/0127267 A1 May 29, 2008

(30) Foreign Application Priority Data

Nov. 29, 2006 (KR) .................. 10-2006-0119200

(51) Int. Cl.
*H04N 5/445* (2006.01)
*H04N 9/74* (2006.01)
(52) U.S. Cl. ............. 725/40; 725/44; 715/721; 715/834
(58) Field of Classification Search .............. 725/37–61; 715/834
See application file for complete search history.

(56) References Cited

U.S. PATENT DOCUMENTS

| | | | |
|---|---|---|---|
| 6,388,714 B1* | 5/2002 | Schein et al. | 348/563 |
| 6,826,774 B1* | 11/2004 | Holme | 725/39 |
| 2003/0106057 A1* | 6/2003 | Perdon | 725/45 |
| 2006/0066755 A1* | 3/2006 | Kowald et al. | 348/581 |
| 2006/0206832 A1* | 9/2006 | Celik et al. | 715/767 |

* cited by examiner

*Primary Examiner* — Andrew Y Koenig
*Assistant Examiner* — Carmine Malangone
(74) *Attorney, Agent, or Firm* — Roylance, Abrams, Berdo & Goodman L.L.P.

(57) ABSTRACT

A method for providing program guides and an image display apparatus using the method, are provided where a displayed program guide screen is formed in a shape in which a program guide on a first channel surrounds the outer periphery of a program guide on a second channel according to formation information set for formation of the program guides. An electronic program guide EPG is thereby formed using a concentric circle layout with respect to multiple channels and a broadcast program screen of a selected channel is displayed at a central portion of the EPG, so that the recognizability and the readability are improved as well as the convenience for a user.

28 Claims, 7 Drawing Sheets

METHOD FOR PROVIDING PROGRAM GUIDES AND IMAGE DISPLAY APPARATUS USING THE SAME

CROSS-REFERENCE TO RELATED APPLICATIONS

This application claims the benefit under 35 U.S.C. §119(a) of Korean Patent Application No. 10-2006-0119200, filed on Nov. 29, 2006, in the Korean Intellectual Property Office, the entire disclosure of which is hereby incorporated by reference.

BACKGROUND OF THE INVENTION

1. Field of the Invention

The present invention relates to a method for providing program guides and an image display apparatus using the method. More particularly, the present invention relates to a method for providing program guides which displays the program guides using a concentric circle layout and provides the program guides so that navigation can be performed easily, and relates to an image display apparatus using the method.

2. Description of the Related Art

An image display apparatus is an apparatus for displaying broadcast programs received from outside through an antenna, and generally includes a television (TV). Such an image display apparatus not only displays the broadcast programs received from outside through the antenna but also provides an electronic program guide (EPG) guiding the broadcast programs. Generally, the EPG provides a function of conveniently searching for a broadcast program which is to be watched by a user as the number of channels increases. The image display apparatus detects program information included in a broadcast program received from outside and stores it in a memory to provide it to the EPG when a user requires it.

FIG. 1 is a view for explaining a method for providing a program guide of a conventional image display apparatus. Referring to FIG. 1, the image display apparatus provides an EPG according to a corresponding broadcast channel and the total time range and the arrangement of a time axis.

More specifically, the image display apparatus is classified according to categories such as ground-wave broadcasts, news/financial technologies, movies, and so on, and provides channels such as KBS1, KBS2, and so on, in the ground-wave broadcast category. In the case in which a user selects the CNN channel 3a in a broadcast channel list using a channel selection section 3 and selects 24 hours 5a as the total time range of the time axis 11 using a time axis setting section 5 and selects a rectangle 5b as the arrangement of the time axis 11, the image display apparatus provides a rectangular EPG 10 without any channel axis. Then, the selected CNN channel 10a is displayed at a central portion of the EPG 10, the rectangular time axis 11 is displayed as 24 hours together with time scales along the circumference, and the broadcast programs of the CNN channel 10a, which correspond to each time, are displayed on one screen.

However, the EPG provided by the conventional program guide providing method provides the broadcast program information only on the channel selected by a user, for example, only on one channel.

Therefore, it is quite troublesome for a user to move to the broadcast channel list to select another channel in the EPG if broadcast program information on the channel is to be seen. Further, specific information on the broadcast program selected by a user is not provided.

Accordingly, there is a need for an improved method for providing program guides so that navigation can be performed more easily.

SUMMARY OF THE INVENTION

Exemplary embodiments of the present invention address at least the above problems and/or disadvantages and provide at least the advantages described below. Accordingly, an exemplary aspect of exemplary embodiments of the present invention is to provide a method for providing program guides which displays the program guide using a concentric circle layout on a plurality of channels and an image display apparatus using the method.

Another exemplary aspect of the present invention is to provide a method for providing program guides which allows navigation in program guides and an image display apparatus using the method.

Another exemplary aspect of the present invention is to provide a method for providing program guides which provides detailed information on a broadcast program selected in the program guides and an image display apparatus using the method.

In order to achieve the above-described aspects of exemplary embodiments of the present invention, a method for providing program guides is provided, which comprises forming a program guide screen of a shape in which a program guide on a first channel surrounds the outer periphery of a program guide on a second channel according to formation information set for formation of the program guides and displaying the formed program guide screen.

In an exemplary implementation, the formation information may comprise at least one of the number of channels to be displayed on the program guide screen, a time range to be displayed on the program guide screen, and forms of the first and second channel program guides and may be set in a formation information setting menu.

In an exemplary implementation, the forming the program guide screen may comprise forming program guides corresponding to the number of channels set in the formation information setting menu so as to have the set forms and the set time range.

In an exemplary implementation, in the forming the program guide screen, the first channel program guide and the second channel program guide may take one form of a circular ring and a rectangular ring and time scales of the set time range and corresponding times may be sequentially displayed at the circumference of the fist channel program guide.

In an exemplary implementation, the forming the program guide screen may comprise displaying at least one of a channel list including the first and second channels, indications representing that the channels in the channel list can be moved upward and downward, the first and second channel program guides, indications representing that the first and second channel program guides can be moved upward, downward, to the right, and to the left, a current date, a broadcasting date of the programs displayed in the first and second channel program guides, a screen of a broadcast program selected in one of the first and second channel program guides, and information on the selected program.

In an exemplary implementation, in the forming the program guide screen, the first and second channels included in the channel list and the first and second channel program guides corresponding to the first and second channels may be indicated in the same colors, respectively.

In an exemplary implementation, the screen of the selected broadcast program may be displayed on the inner side of the second channel program guide and information on the selected broadcast program may be displayed in a quadrant in which the selected program is located in the program guide screen divided into quadrants.

In an exemplary implementation, in the forming the program guide screen, the channel list may be included in the first and second channel program guides and the channel list may be displayed transparently or be flexibly displayed so as not to be overlapped with the selected program.

In an exemplary implementation, in the forming the program guide screen, the first and second channels included in the channel list may be displayed as one of a continuous channel, a user designated channel, and a user preferred channel.

In an exemplary implementation, a program guide on a channel the channel number of which is increased by one may be displayed if a channel increase instruction is input in the program guide screen and a program guide on a channel the channel number of which is decreased by one may be displayed if a channel decrease instruction is input in the program guide screen.

In an exemplary implementation, a program guide corresponding to the previous time range which is continuous with the set time range may be displayed if a left movement instruction is input in the program guide screen and a program guide corresponding to the next time range which is continuous with the set time range may be displayed if a right movement instruction is input in the program guide screen.

In an exemplary implementation, one of broadcast programs of an increased channel which are broadcasted in the same time zone as selected programs and the most overlapped broadcast program of the broadcast programs of the increased channel may be displayed if an upward movement instruction is input in the broadcast program selected in one of the first and second channel program guides, and one of broadcast programs of a decreased channel which are broadcasted in the same time zone as selected programs and the most overlapped broadcast program of the broadcast programs of the increased channel may be displayed if a downward movement instruction is input in the broadcast program selected in one of the first and second channel program guides.

In an exemplary implementation, a broadcast program located in a counter-clockwise direction of a selected broadcast program may be displayed if a left movement instruction is input in the broadcast program selected in one of the first and second channel program guides, and a broadcast program located in a clockwise direction of a selected broadcast program may be displayed if a right movement instruction is input in the broadcast program selected in one of the first and second channel program guides.

According to one exemplary aspect of the present invention, an image display apparatus comprises an OSD formation section forming a program guide screen of a shape in which a program guide on a first channel surrounds the outer periphery of a program guide on a second channel; and a controller controlling the OSD formation section so that the program guide screen can be formed and displayed according to formation information set for formation of the program guides.

In an exemplary implementation, the formation information may comprise at least one of the number of channels to be displayed on the program guide screen, a time range to be displayed on the program guide screen, and forms of the first and second channel program guides and is set in a formation information setting menu.

In an exemplary implementation, the controller may control the OSD formation section so that program guides corresponding to the number of channels set in the formation information setting menu can be formed so as to have the set forms and the set time range.

In an exemplary implementation, the controller may control the OSD formation section so that the first channel program guide and the second channel program guide can take one form of a circular ring and a rectangular ring and time scales of the set time range and corresponding times can be sequentially displayed at the circumference of the fist channel program guide.

In an exemplary implementation, the controller may control the OSD formation section so that at least one of a channel list including the first and second channels, indications representing that the channels in the channel list can be moved upward and downward, the first and second channel program guides, indications representing that the first and second channel program guides can be moved upward, downward, to the right, and to the left, a current date, a broadcasting date of the programs displayed in the first and second channel program guides, a screen of a broadcast program selected in one of the first and second channel program guides, and information on the selected program can be displayed.

In an exemplary implementation, the controller may control the OSD formation section so that the first and second channels included in the channel list and the first and second channel program guides corresponding to the first and second channels can be indicated in the same colors, respectively.

In an exemplary implementation, the controller may control the OSD formation section so that the screen of the selected broadcast program can be displayed on the inner side of the second channel program guide and information on the selected broadcast program can be displayed in a quadrant in which the selected program is located in the program guide screen divided into quadrants.

In an exemplary implementation, the controller may control the OSD formation section so that the channel list can be included in the first and second channel program guides and the channel list can be displayed transparently or is flexibly displayed so as not to be overlapped with the selected program.

In an exemplary implementation, the controller may control the OSD formation section so that the first and second channels included in the channel list can be displayed as one of a continuous channel, a user designated channel, and a user preferred channel.

In an exemplary implementation, a program guide on a channel the channel number of which is increased by one may be displayed if a channel increase instruction is input in the program guide screen and a program guide on a channel the channel number of which is decreased by one may be displayed if a channel decrease instruction is input in the program guide screen.

In an exemplary implementation, the controller may control the OSD formation section so that a program guide corresponding to the previous time range which is continuous with the set time range can be displayed if a left movement instruction is input in the program guide screen and a program guide corresponding to the next time range which is continuous with the set time range can be displayed if a right movement instruction is input in the program guide screen.

In an exemplary implementation, the controller may control the OSD formation section so that one of broadcast programs of an increased channel which are broadcasted in the same time zone as selected programs and the most overlapped broadcast program of the broadcast programs of the increased channel can be displayed if an upward movement instruction is input in the broadcast program selected in one of the first and second channel program guides, and one of broadcast programs of a decreased channel which are broadcasted in the same time zone as selected programs and the most overlapped broadcast program of the broadcast programs of the increased channel can be displayed if an downward movement instruction is input in the broadcast program selected in one of the first and second channel program guides.

In an exemplary implementation, the controller may control the OSD formation section so that a broadcast program located in a counter-clockwise direction of a selected broadcast program can be displayed if a left movement instruction is input in the broadcast program selected in one of the first and second channel program guides, and a broadcast program located in a clockwise direction of a selected broadcast program can be displayed if a right movement instruction is input in the broadcast program selected in one of the first and second channel program guides.

Other objects, advantages and salient features of the invention will become apparent to those skilled in the art from the following detailed description, which, taken in conjunction with annexed drawings, discloses exemplary embodiments of the invention.

BRIEF DESCRIPTION OF THE DRAWINGS

The above aspects and exemplary features of the present invention will be more apparent by describing certain exemplary embodiments of the present invention with reference to the accompanying drawings, in which.

DETAILED DESCRIPTION OF EXEMPLARY EMBODIMENTS

Certain exemplary embodiments of the present invention will now be described in greater detail with reference to the accompanying drawings.

The matters defined in the description such as a detailed construction and elements are provided to assist in a comprehensive understanding of embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
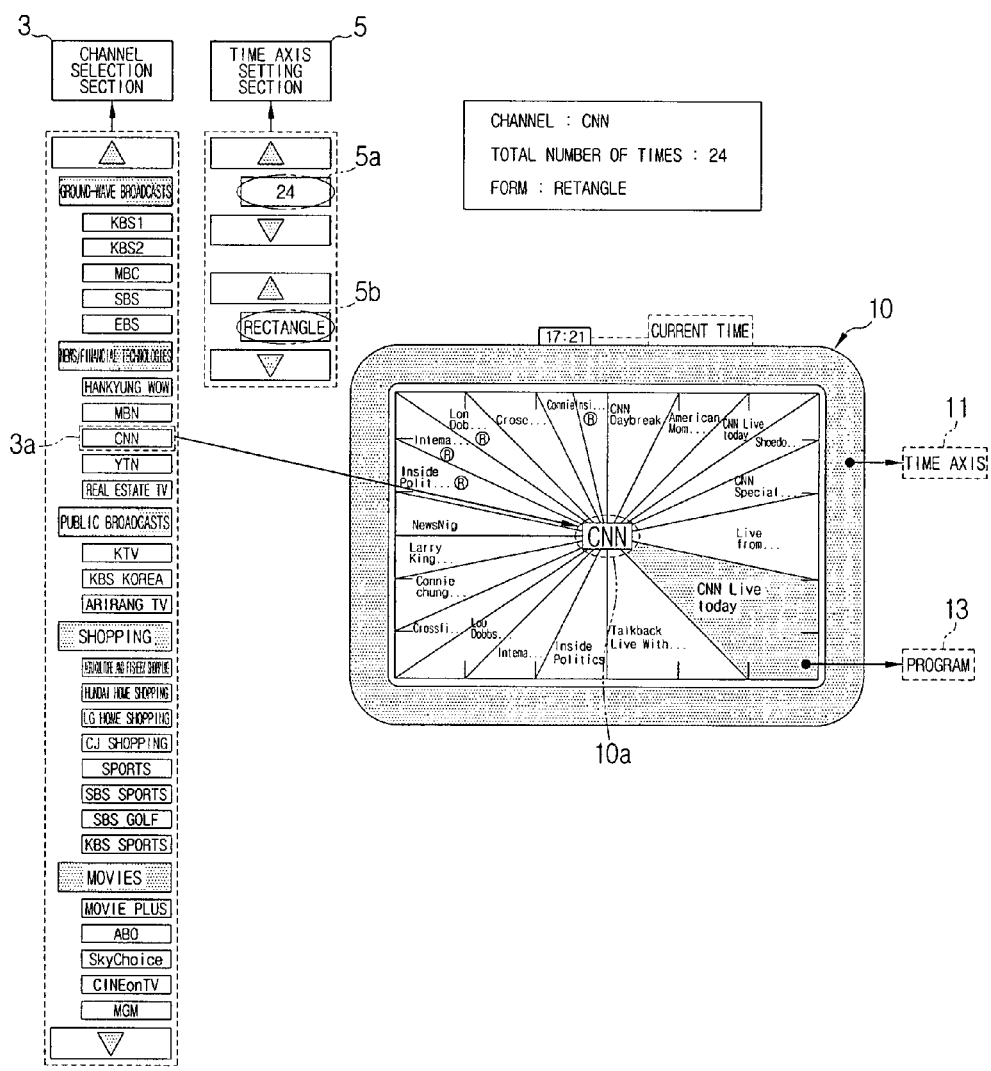
FIG. 1 is a view for explaining a conventional method for providing a program guide.
Figure 2:
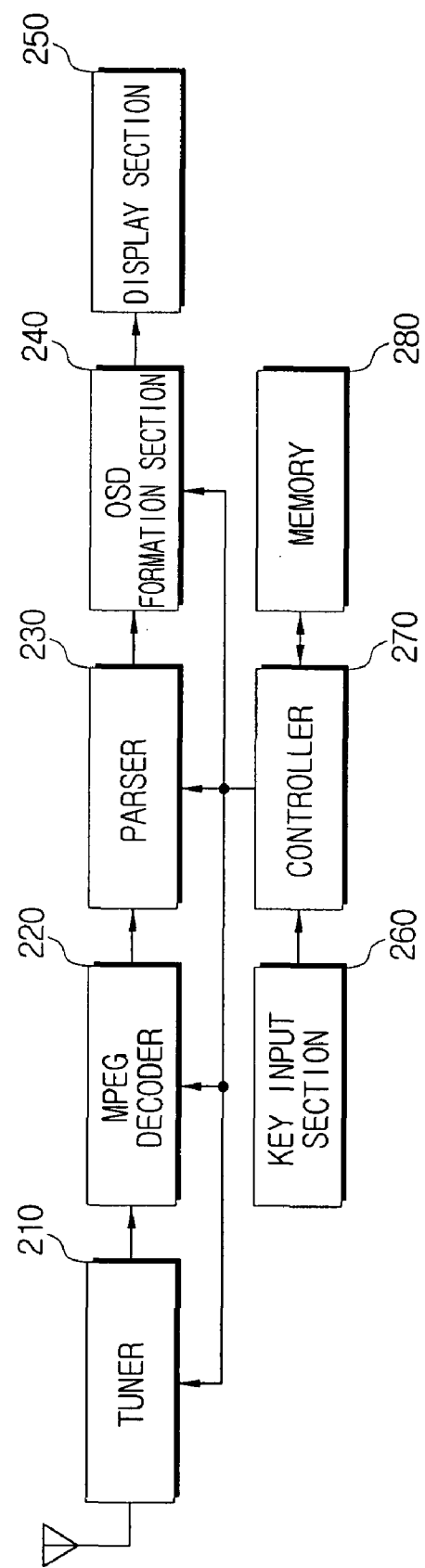
FIG. 2 is a block diagram of an image display apparatus according to an exemplary embodiment of the present invention.

FIG. 2 is a block diagram of an image display device according to an exemplary embodiment of the present invention.

The image display apparatus displays a program guide (hereinafter, referred to as EPG) using a concentric circle layout with respect to multiple channels. Then, the image display apparatus displays a broadcast program screen of a selected channel at a central portion of the EPG, together with detailed information of the broadcast program of the channel selected by the EPG. Further, the image display apparatus provides a navigation method for selection of movement of a channel in the EPG and of movement of a program of a channel.

Referring to FIG. 2, the image display apparatus comprises a tuner 210, an MPEG decoder 220, a parser 230, an OSD formation section 240, a display section 250, a key input section 260, a controller 270, and a memory 280.

The tuner 210 receives a broadcast program of a channel selected by a user. The MPEG decoder 220 releases compression of a broadcast program received through the tuner 210. The parser 230 parses information included in the broadcast program, the compression of which has been released by the MPEG decoder 220.

The OSD formation section 240 forms an EPG with program information of the channels parsed by the parser 230 using a concentric circle layout and forms an EPG screen including the EPG. Then, the OSD formation section 240 provides a menu allowing a user to set EPG formation information and forms the EPG screen on the basis of the EPG formation information set in the menu and the preset EPG formation information.

When the EPG is formed, the OSD formation section 240 displays a broadcast program screen of a current channel at a central portion of the EPG in PIG (picture in graphic). Further, if a broadcast program is selected in the EPG by a user, the OSD formation section 240 displays the broadcast program screen of the selected channel at a central portion of the EPG. The display section 250 displays an EPG screen formed by the OSD formation section 240.

The key input section 260 includes a key for requesting an EPG and an EPG formation information setting menu, upward, downward, right, and left movement keys for setting EPG formation information and for navigation in the EPG, a confirmation key for selection of a program, and upward and downward movement keys for a channel. If a signal is input by a key included in the key input section 260, the key input section 260 transfers an instruction corresponding to the signal to the controller 270.

The controller 270 stores program information of the channels parsed by the parser 230 in the memory 280. Further, if an EPG request instruction is input from the key input section 260, the controller 270 controls the OSD formation section 240 so as to form the EPG with the program information of the channels, which is stored in the memory 280, according to the EPG formation information set in the EPG formation information setting menu.

The program information of the channels parsed by the parser 230, the EPG formation information set by a user, and the preset EPG formation information are stored in the memory 280. Then, the EPG formation information which can be set by a user includes the number of channels and the time range which are to be displayed in the EPG and can be set in the EPG formation information setting menu provided by the OSD formation section 240. Further, the preset EPG formation information includes basic information required for formation of the EPG screen, for example, a position at which the current date and time are to be displayed, a position at which a broadcasting date of the programs shown in the EPG is to be displayed, and a position at which detailed information of the program selected by the EPG is to be displayed and is pre-stored.

Figure 3A:
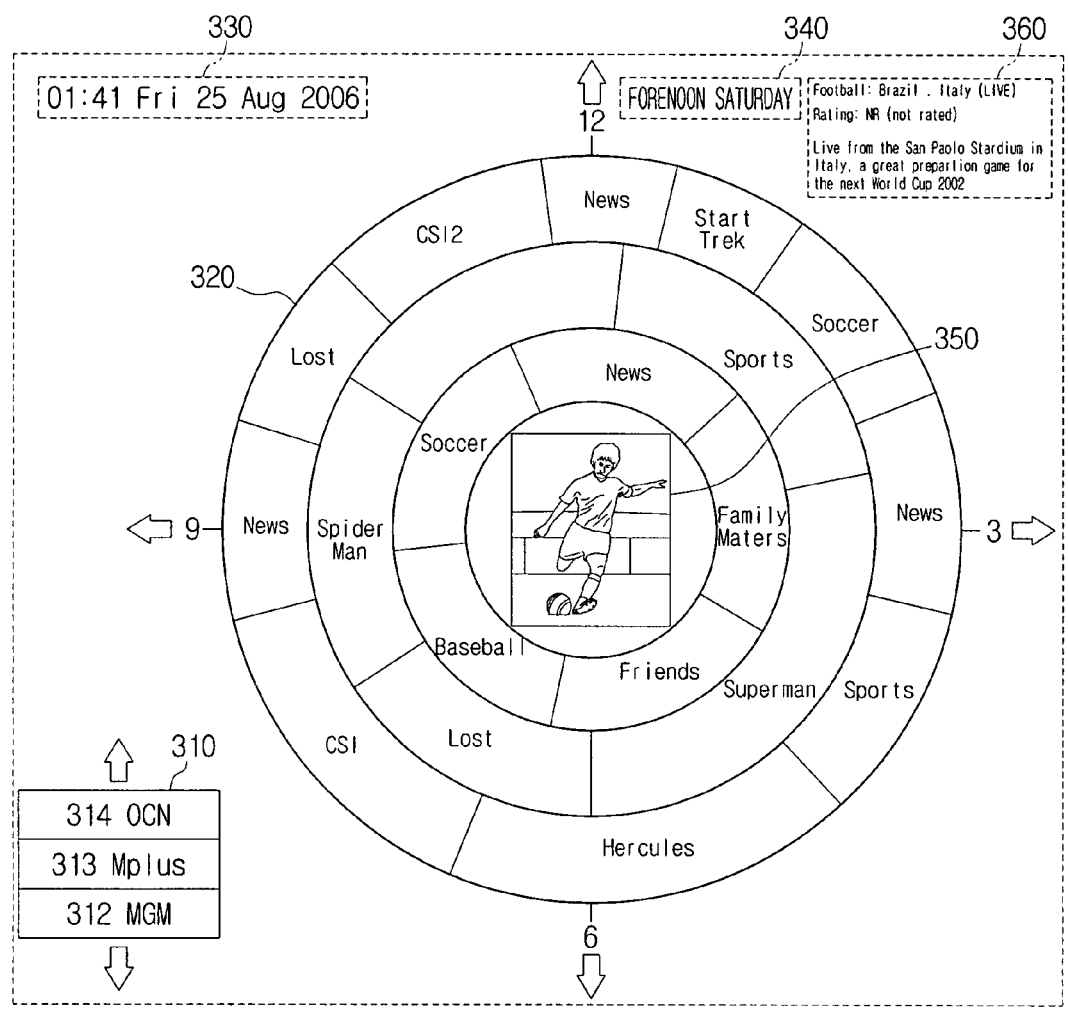
FIG. 3A is a view showing multi-channel program guides formed by a method for providing program guides of an image display apparatus according to an exemplary embodiment of the present invention.

FIG. 3A is a view showing a multi-channel program guide formed by a method for providing program guides of an image display apparatus according to an exemplary embodiment of the present invention.

FIG. 3A shows an EPG screen including an EPG 320 on three channels. The EPG screen includes a channel list 310, indications ↑↓ representing that the channels in the channel list 310 can be moved upward and downward, an EPG 320, indications ↑ ↓ ← → representing that the EPG 320 can be moved upward, downward, to the right, and to the left, a current date and time 330, a broadcasting date 340 of the programs displayed in the EPG 320, a program screen 350 selected by the EPG 320 and provided at a central portion of the EPG 320, and detailed information 360 of the program selected by the EPG 320.

More specifically, if the number of channels, which is to be displayed in the EPG 320, is set to three in the EPG formation information setting menu through the key input section 260, the OSD formation section 240 forms the channel list 310 so that the three channels and the names of the broadcasting stations can be displayed and forms the indications ↑↓ representing that the channels in the channel list 310 can be moved upward and downward.

Further, the OSD formation section 240 forms the EPG 320 so that three concentric circles corresponding to the three channels can be displayed in the EPG 320 and forms the indications ↑ ↓ ← → representing that the EPG 320 can be moved upward, downward, to the right, and to the left. More specifically, the OSD formation section 240 forms the EPG 320 so that the concentric circle corresponding to Channel 313 surrounds the outer periphery of the concentric circle corresponding to Channel 312 and the concentric circle corresponding to Channel 314 surrounds the concentric circle corresponding to Channel 313. For this, the concentric circles take the form of circular rings.

Then, the OSD formation section 240 endows the concentric circles corresponding to the channels of the channel list 310 with the same colors, respectively, in order to discriminate the channels corresponding to the concentric circles. For example, Channel 312 and the innermost concentric circle are indicated in red, Channel 313 and the middle concentric circle, in orange, and Channel 314 and the outermost concentric circle, in yellow.

On the other hand, the number of channels can be set by zoon-in/zoom-out keys provided in the key input section 260 in addition to the EPG formation information setting menu. More specifically, if a zoom-in signal is input from the EPG 320, the OSD formation section 240 forms an EPG in which the number of channels are reduced by one. Further, if a zoom-out signal is input, the OSD formation section 240 forms an EPG in which the number of channels is increased by one.

Further, if the time range to be displayed in the EPG 320 is set to twelve hours in the EPG formation information setting menu through the key input section 260, the OSD formation section 240 forms the EPG 320 so that program information of broadcast programs received for twelve hours in the channels corresponding to the concentric circles and sequentially displays the time scales and the corresponding times in twelve hours at the periphery of the EPG 320.

Then, the time can be displayed by one hour or can be displayed by thirty minutes according to the setting of a user. On the other hand, the time range can be variously set to six hours, twelve hours, twenty four hours, or thirty six hours.

Further, the OSD formation section 240 displays the current date and time 330, for example, '01:41 Fri 25 Aug 2006' at an upper end of the left side of the EPG screen and displays the broadcast date 340 of the programs displayed in the EPG 320, for example, 'Forenoon Saturday' at an upper end of the EPG 320. That is, the EPG 320 displays the programs which are to be broadcast in the forenoon of Saturday.

Further, the OSD formation section 240 displays the program screen 350 selected by the EPG 320 at a central portion of the EPG 320 in PIG. Further, the OSD formation section 240 also displays the detailed information 360 of the program selected by the EPG 320. For example, if the soccer of Channel 314 is selected by the EPG 320, the OSD formation section 240 highlights the selected soccer field of the EPG 320 in a different brightness and displays the soccer program screen 350 received by Channel 314 at a central portion of the EPG 320. That is, the program screen 350 is displayed on the inner side of the concentric circle corresponding to Channel 312.

Further, the OSD formation section 240 displays information included in the soccer program in a quadrant in which the soccer of Channel 314 is located in the EPG 320. That is, the EPG screen is divided to quadrants and the detailed information 360 of the selected program is displayed in the quadrant in which the program selected by the EPG 320 is located.

If a channel-up instruction is input in the channel list 310 through a key for upward movement of channel which is included in the key input section 260, the OSD formation section 240 increases the channel numbers of the channel list 310 to display the increased channel number. On the other hand, if a channel-down instruction is input, the channel numbers are decreased to be displayed.

Then, the OSD formation section 240 displays programs represented in the EPG 320 in correspondence to the channels in which the channel numbers are increased or decreased. More specifically, if the channel-up instruction is input, the channels in the channel list 310 are displayed as 315, 314, and 313 and displays program information of the broadcast programs received in Channels 315, 314, and 313.

Further, upward, downward, right, and left movements of the EPG 320 are possible. More specifically, even in the case in which the upward and downward movements of the channels are not selected in the channel list 310, if an up instruction is input through the key for upward movement of channel which is included in the key input section 260 in the EPG 320, the OSD formation section 240 displays program information of the broadcast programs received in Channels 315, 314, and 313, the channel numbers of which are increased, in the EPG 320.

On the other hand, if a down instruction is input through a key for downward movement of channel which is included in the key input section 260, the OSD formation section 240 displays program information of the broadcast programs received in Channels 313, 312, and 311, the channel numbers of which are decreased, in the EPG 320.

Further, if an increase instruction is input through a volume increase key included in the key input section 260 in the EPG 320, the OSD formation section 240 displays program information of broadcast programs received for the next twelve hours of the same channel, i.e. in the afternoon of Saturday in the EPG 320.

On the other hand, if a decrease instruction is input through a volume decrease key included in the key input section 260 in the EPG 320, the OSD formation section 240 displays program information of broadcast programs received for the previous twelve hours of the same channel, for example, in the afternoon of Friday in the EPG 320.

Until now, although it has been explained that the volume increase/decrease keys are used for the right and left movements of the EPG 320, it is merely an exemplary embodiment of the present invention and other keys may be used.

Further, upward, downward, right, and left movements in the EPG 320 are also possible. More specifically, even in the case in which the upward and downward movements of the channels are not selected in the channel list 310, if an up instruction is input through the key for upward movement of channel which is included in the key input section 260 in the EPG 320, the OSD formation section 240 displays program information of the broadcast programs received in the channels in which the channel numbers are increased in the EPG 320.

For example, if an up instruction is input when a program selection cursor is located in a soccer program of Channel 314, the OSD formation section 240 displays program information of Channels 315, 314, and 313 in the EPG 320 and moves the program selection cursor to the program information of Channel 315 which is received at the same time as the soccer program of Channel 314.

On the other hand, if a down instruction is input through a downward movement key in the key input section 260 when the program selection cursor is located in a soccer program of Channel 314, the OSD formation section 240 displays program information of Channel 313 which is most overlapped with the soccer program of Channel 314. That is, the OSD formation section 240 moves the program selection cursor to sports of channel 313.

Further, if a movement instruction is input through a left movement key included in the key input section 260 when the program selection cursor is located in the soccer program of Channel 314, the OSD formation section 240 moves the program selection cursor to a star track program of Channel 314 in the counter-clockwise direction.

On the other hand, if a movement instruction is input through a right movement key included in the key input section 260 when the program selection cursor is located in the soccer program of Channel 314, the OSD formation section 240 moves the program selection cursor to a news program of Channel 314 in the clockwise direction.

Figure 3B:
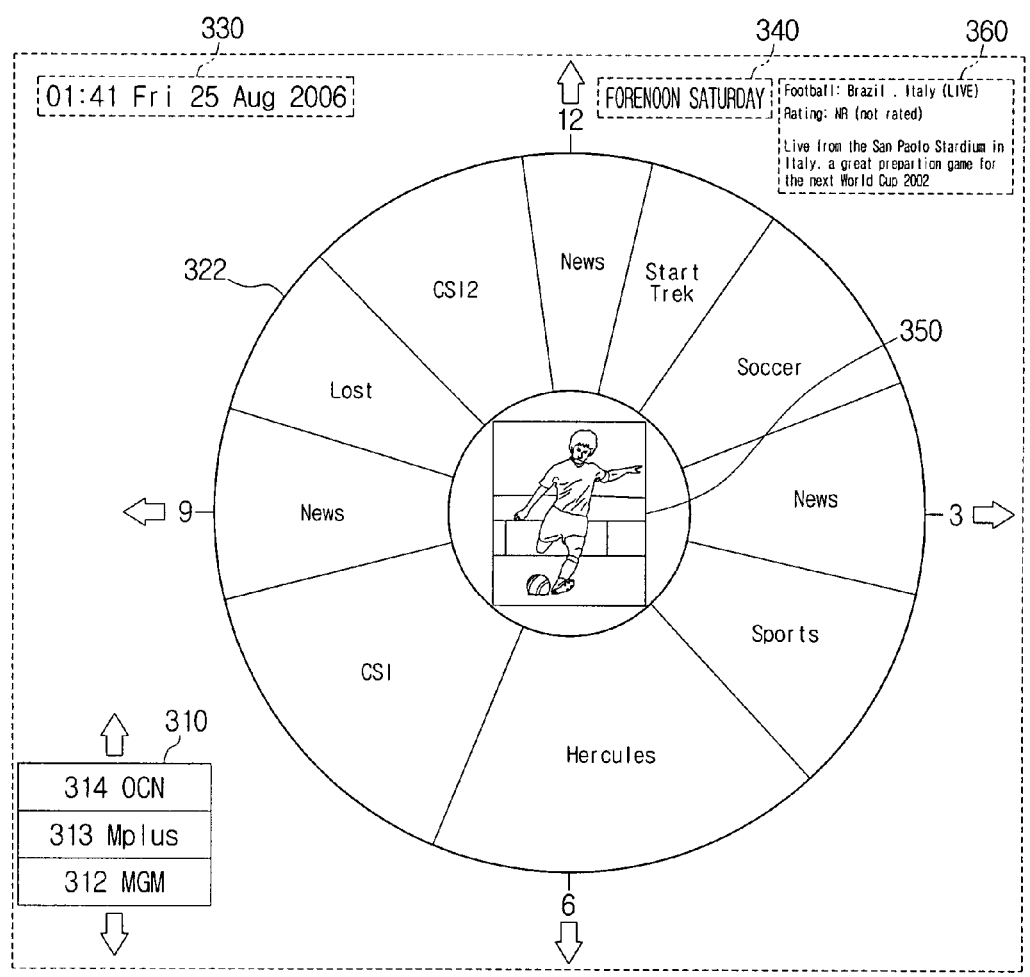
FIG. 3B is a view showing a one-channel program guide formed by a method for providing program guides of an image display apparatus according to an exemplary embodiment of the present invention.

FIG. 3B is a view showing a one-channel program guide formed by a method for providing program guides of an image display apparatus according to an exemplary embodiment of the present invention.

FIG. 3B represents an EPG screen in the case in which one channel, for example, Channel 314 is selected in the channel list 310. The EPG screen of FIG. 3B is the same as the multi-channel EPG screen, but the EPG 322 represents only the program information on Channel 314.

More specifically, if Channel 314 is selected in the channel list 310, the OSD formation section 240 converts the EPG 320 to the EPG 322 on Channel 314. Then, as an example of a predetermined key included in the key input section 260, if a cancel instruction is input by a cancel key, the OSD formation section 240 converts the EPG 322 to the EPG 320 on the three channels.

Figure 4A:
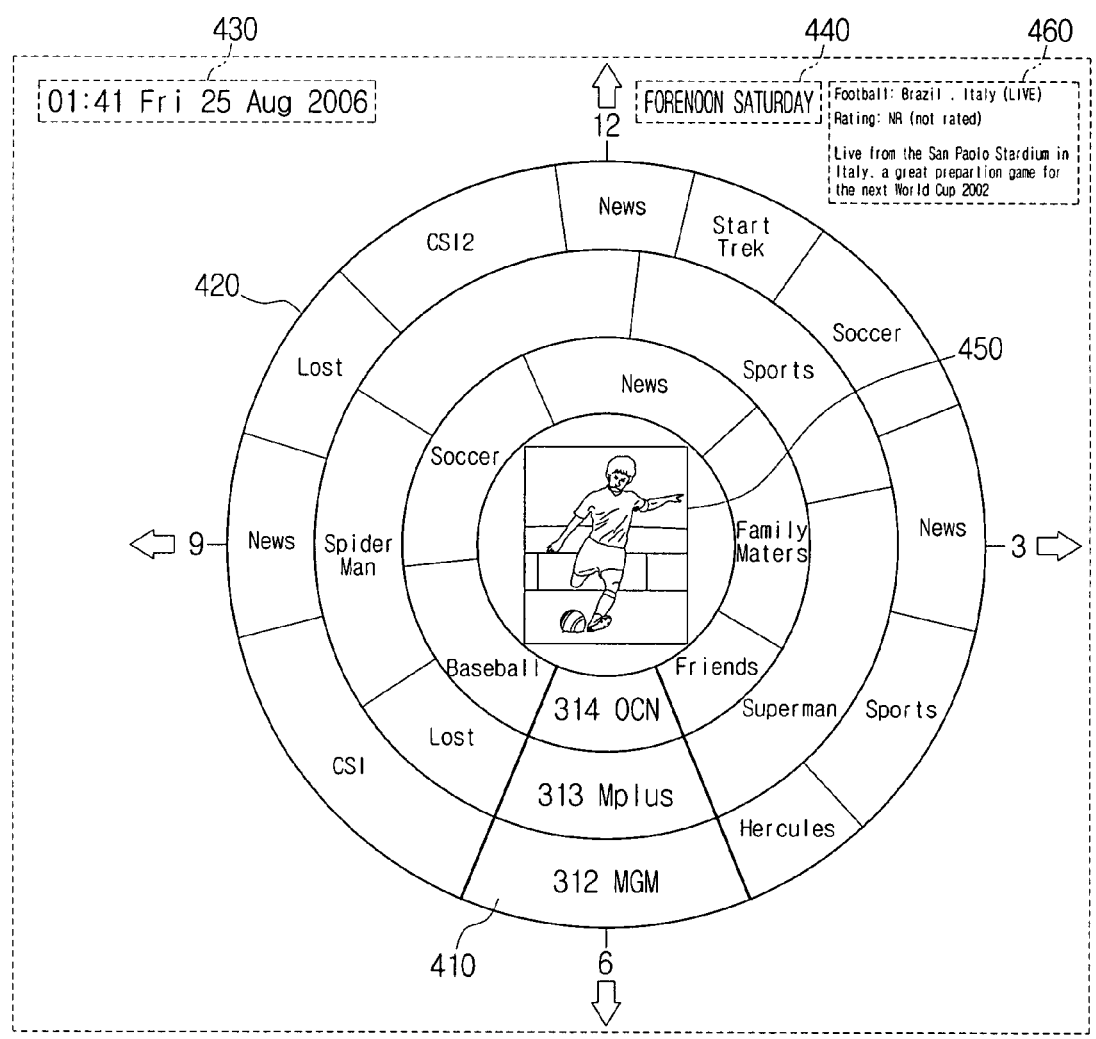
FIG. 4A is a view showing multi-channel program guides formed by a method for providing program guides of an image display apparatus according to another exemplary embodiment of the present invention.

FIG. 4A is a view showing a multi-channel program guide formed by a method for providing program guides of an image display apparatus according to another exemplary embodiment of the present invention.

FIG. 4A represents an EPG screen including an EPG 420 on three channels which can be moved upward, downward, to the right, and to the left, a current date and time 430, a broadcasting date 440 of the programs displayed in the EPG 420, a program screen 450 selected by the EPG 420 and provided at a central portion of the EPG 420, and detailed information 460 of the program selected by the EPG 4320. The EPG screen of FIG. 4A is similar to the EPG screen of FIG. 3A, but the EPG 420 includes a channel list 410.

Then, the position of the channel list 410 included in the EPG 420 can be fixed or moved. In the case in which the position of the channel list 410 is fixed, the OSD formation section 240 can display the time in the EPG 420 except for the section of the channel list 410. Further, the OSD formation section 240 can display the time in the same way as the EPG 320 of FIG. 3*a* and can display the channel list 410 transparently on the EPG 420.

On the other hand, in the case in which the position of the channel list 410 is varied, the OSD formation section 240 varies the position of the channel list 410 according to the position of a selected program. For example, if the news of Channel 314 which is located in the direction of twelve o'clock is selected in the EPG 420, the OSD formation section 240 displays the channel list in the direction of opposite six o'clock. That is, the channel list 410 is flexibly displayed so as not to be overlapped with the selected program.

Figure 4B:
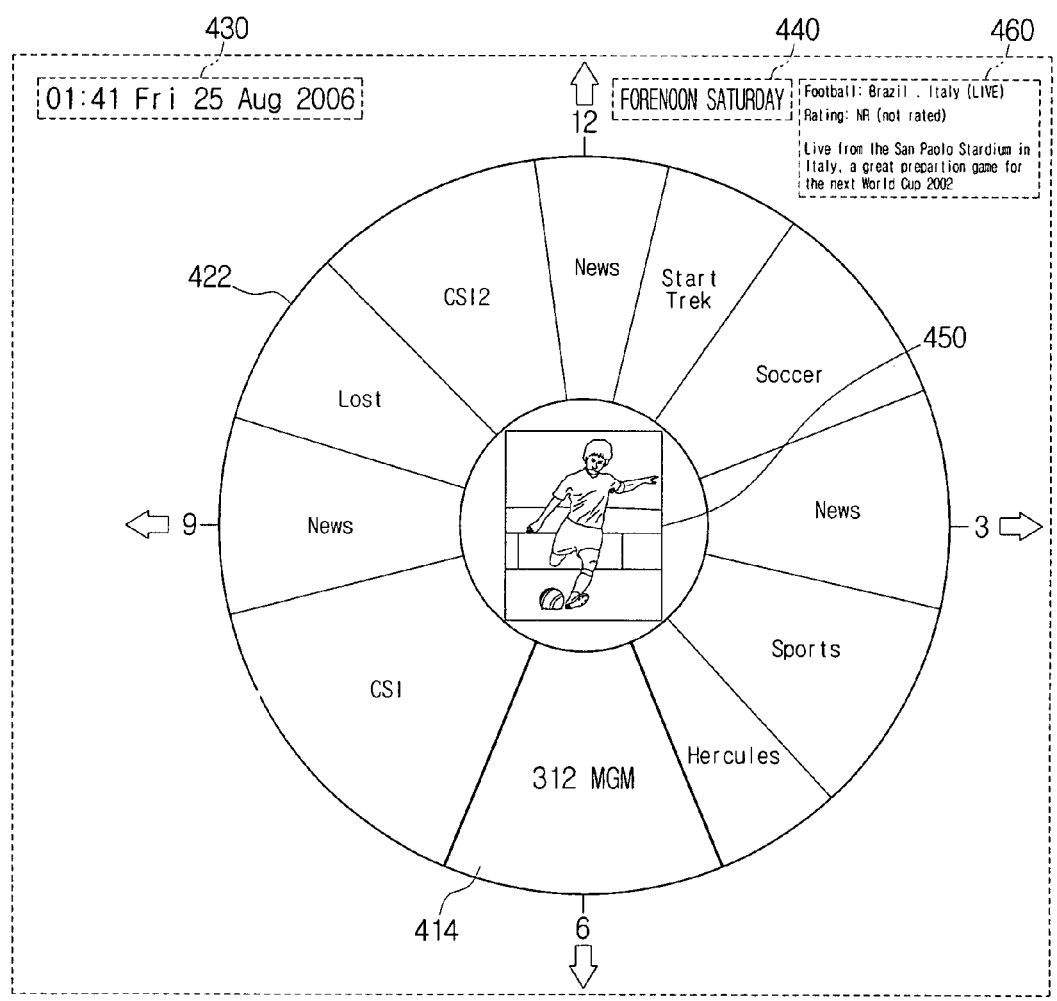
FIG. 4B is a view showing a one-channel program guide formed by a method for providing program guides of an image display apparatus according to another exemplary embodiment of the present invention.

FIG. 4B is a view showing a one-channel program guide formed by a method for providing program guides of an image display apparatus according to another exemplary embodiment of the present invention.

FIG. 4B represents an EPG screen in the case in which one channel, for example, Channel 314 is selected in the channel list 310. The EPG screen of FIG. 4B is similar to the EPG screen of FIG. 3B, but an EPG 422 includes a channel list 414. Then, the channel list 414 included in the EPG 422 represents only the selected Channel 312.

In the same way, if a cancel instruction is input by a cancel key included in the key input section 260, the OSD formation section 240 converts the EPG 422 to the EPG 420 on the three channels.

In FIGS. 3A and 4A, the channel lists 310 and 410 show the continuous channels, for example, channels 312, 313, and 314 represent channels that are continuous whereas channel lists 310 and 410 may also represent channels which are not continuous. More specifically, the channel lists 310 and 410 can represent a user designated channel, a preferred channel, and so on.

Figure 5:
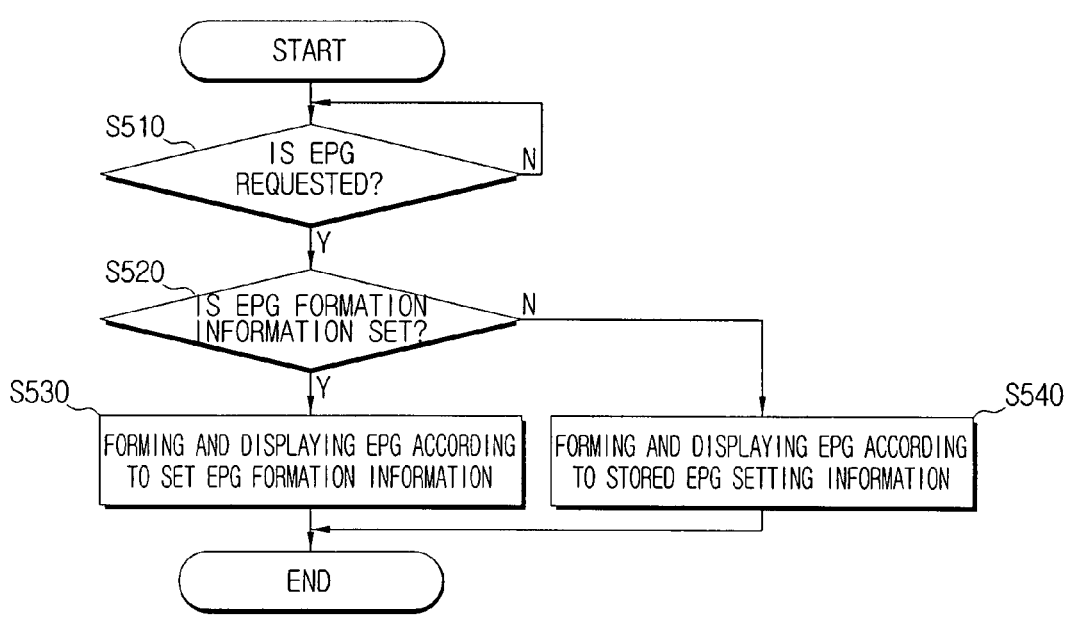
FIG. 5 is a flow chart provided for explanation of a method for providing program guides of an image display device according to an exemplary embodiment of the present invention.

FIG. 5 is a flow chart provided for explanation of a method for providing program guides of an image display device according to an exemplary embodiment of the present invention.

Referring to FIG. 5, the controller 270 determines whether an EPG is requested (S510). If an EPG request instruction is input from the key input section 260, the controller 270 determines that the EPG is requested by a user.

If the EPG is determined to be requested, the controller 270 determines whether EPG formation information is set by a user. (S520)

If the EPG formation information is determined to be set, the controller 270 controls the OSD formation section 240 so that the EPG is formed and displayed according to the set EPG formation information. (S530)

On the other hand, if the EPG formation information is determined to be not set, the controller 270 controls the OSD formation section 240 so that the EPG is formed and displayed according to the stored EPG setting information. (S540)

Until now, although it has been explained that an EPG on a plurality of channels is formed using a layout in the form of concentric circles, it is merely an exemplary embodiment and other forms such as triangles, rectangles, rhombuses, hexagons, and so on are possible. Further, it can be set in the EPG formation information setting menu.

Then, in the case in which the EPG takes the form of triangles, the EPG on multiple channels can be formed in the form of triangular rings so that the EPG on one channel can surround the outer periphery of the EPG on another channel. Further, in the case in which the EPG takes the form of rectangles and hexagons, the EPG can be formed in the form of rectangular rings and hexagonal rings, respectively.

As mentioned above, according to the exemplary embodiments of the present invention, since the EPG is formed using the concentric circle layout with respect to the multiple channels and the broadcast program screen of the selected channel is displayed at a central portion of the EPG, the recognizability and the readability are improved as well as the convenience for a user.

The exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method for providing program guides, comprising:
   forming a program guide screen comprising a program guide on at least a first channel surrounding an outer periphery of a program guide on at least a second channel according to formation information set for formation of the at least first and second program guides, an information portion comprising information on a selected program, and a channel list comprising at least one channel corresponding to programs in the program guide; and
   displaying the formed program guide screen,
   wherein the information portion is displayed on a first area of the program guide screen distinct from the program guides,
   wherein the channel list is displayed on a second area of the program guide screen distinct from the program guide and the information portion.

2. The method as claimed in claim 1, wherein the formation information comprises at least one of a number of channels to be displayed on the program guide screen, a time range to be displayed on the program guide screen, and forms of the first and second channel program guide, and
   the formation information is set in a formation information setting menu.

3. The method as claimed in claim 2, wherein the forming of the program guide screen further comprises forming program guides corresponding to the number of channels set in the formation information setting menu to have the set forms and the set time range.

4. The method as claimed in claim 3, wherein the forming of the program guide screen further comprises:
   providing the first channel program guide and the second channel program guide in a form of at least one of a circular ring and a rectangular ring; and
   sequentially displaying time scales of the set time range and corresponding times at the circumference of the first channel program guide.

5. The method as claimed in claim 3, further comprising:
   displaying a program guide corresponding to the previous time range which is continuous with the set time range, if a left movement instruction is input in the program guide screen; and
   displaying a program guide corresponding to the next time range which is continuous with the set time range, if a right movement instruction is input in the program guide screen.

6. The method as claimed in claim 1, wherein the forming the program guide screen further comprises displaying at least one of
   the channel list including the first and second channels, indications representing that the channels in the channel list can be moved upward and downward, the first and second channel program guides, indications representing that the first and second channel program guides can be moved upward, downward, to the right, and to the left,
   a current date,
   a broadcasting date of the programs displayed in the first and second channel program guides, and
   a screen of a broadcast program selected in one of the first and second channel program guides.

7. The method as claimed in claim 6, wherein the forming of the program guide screen further comprises:
   providing the first and second channels in the channel list; and
   indicating the first and second channel program guides corresponding to the first and second channels in the same colors, respectively.

8. The method as claimed in claim 6, wherein the forming of the program guide screen further comprises displaying the channel list included in the first and second channel program guides transparently or flexibly so as not to be overlapped with the selected program.

9. The method as claimed in claim 8, wherein the forming of the program guide screen further comprises displaying the first and second channels included in the channel list as one of a continuous channel, a user designated channel, and a user preferred channel.

10. The method as claimed in claim 1, wherein the screen of the selected broadcast program is displayed on the inner side of the second channel program guide and information on the selected broadcast program is displayed in a quadrant in which the selected program is located in the program guide screen divided into quadrants.

11. The method as claimed in claim 1, further comprising:
displaying program guide on a channel, the channel number of which is increased by one, if a channel increase instruction is input in the program guide screen; and
displaying a program guide on a channel, the channel number of which is decreased by one if a channel decrease instruction is input in the program guide screen.

12. The method as claimed in claim 1, further comprising:
displaying one of broadcast programs of an increased channel which are broadcasted in the same time zone as selected programs and the most overlapped broadcast program of the broadcast programs of the increased channel, if an upward movement instruction is input in the broadcast program selected in one of the first and second channel program guides; and
displaying one of broadcast programs of a decreased channel which are broadcasted in the same time zone as selected programs and the most overlapped broadcast program of the broadcast programs of the increased channel, if an downward movement instruction is input in the broadcast program selected in one of the first and second channel program guides.

13. The method as claimed in claim 1, further comprising:
displaying a broadcast program located in a counter-clockwise direction of a selected broadcast program, if a left movement instruction is input in the broadcast program selected in one of the first and second channel program guides; and
displaying a broadcast program located in a clockwise direction of a selected broadcast program, if a right movement instruction is input in the broadcast program selected in one of the first and second channel program guides.

14. An image display apparatus comprising:
an on screen display ("OSD") formation section forming a program guide screen comprising a program guide on at least a first channel surrounding the outer periphery of a program guide on at least a second channel, an information portion comprising information on a selected program, and a channel list comprising at least one channel corresponding to programs in the program guide; and
a controller controlling the OSD formation section so that the program guide screen can be formed and displayed according to formation information set for formation of the at least first and second program guides,
wherein the information portion is displayed on a first area of the program guide screen distinct from the program guide,
wherein the channel list is displayed on a second area of the program guide screen distinct from the program guide and the information portion.

15. The image display apparatus as claimed in claim 14, wherein the formation information comprises at least one of a number of channels to be displayed on the program guide screen, a time range to be displayed on the program guide screen, and forms of the first and second channel program guides, and
the formation information is set in a formation information setting menu.

16. The image display apparatus as claimed in claim 15, wherein the controller controls the OSD formation section so that program guides corresponding to the number of channels set in the formation information setting menu are selectively formed so as to have the set forms and the set time range.

17. The image display apparatus as claimed in claim 16, wherein the controller controls the OSD formation section so that the first channel program guide and the second channel program guide selectively form at least one of a circular ring and a rectangular ring and time scales of the set time range and corresponding times are selectively and sequentially displayed at the circumference of the first channel program guide.

18. The image display apparatus as claimed in claim 16, wherein the controller controls the OSD formation section so that a program guide corresponding to the previous time range which is continuous with the set time range is displayed, if a left movement instruction is input in the program guide screen, and a program guide corresponding to the next time range which is continuous with the set time range displayed, if a right movement instruction is input in the program guide screen.

19. The image display apparatus as claimed in claim 14, wherein the controller controls the OSD formation section to display at least one of
the channel list including the first and second channels, indications representing that the channels in the channel list can be moved upward and downward, the first and second channel program guides, indications representing that the first and second channel program guides can be moved upward, downward, to the right, and to the left,
a current date,
a broadcasting date of the programs displayed in the first and second channel program guides, and
a screen of a broadcast program selected in one of the first and second channel program guides.

20. The image display apparatus as claimed in claim 19, wherein the controller controls the OSD formation section so that the first and second channels included in the channel list and the first and second channel program guides corresponding to the first and second channels are selectively indicated in the same colors, respectively.

21. The image display apparatus as claimed in claim 19, wherein the controller controls the OSD formation section so that the channel list is selectively included in the first and second channel program guides and the channel list is selectively displayed transparently or displayed so as not to be overlapped with the selected program.

22. The image display apparatus as claimed in claim 21, wherein the controller controls the OSD formation section so that the first and second channels included in the channel list are displayable as one of a continuous channel, a user designated channel, and a user preferred channel.

23. The image display apparatus as claimed in claim 14, wherein the controller controls the OSD formation section so that the screen of the selected broadcast program is displayable on the inner side of the second channel program guide and information on the selected broadcast program is displayable in a quadrant in which the selected program is located in the program guide screen divided into quadrants.

24. The image display apparatus as claimed in claim 14, wherein a program guide on a channel the channel number of which is increased by one is displayed, if a channel increase instruction is input in the program guide screen, and a program guide on a channel the channel number of which is decreased by one is displayed, if a channel decrease instruction is input in the program guide screen.

25. The image display apparatus as claimed in claim 14, wherein the controller controls the OSD formation section so that one of broadcast programs of an increased channel which are broadcasted in the same time zone as selected programs and the most overlapped broadcast program of the broadcast programs of the increased channel are displayed, if an upward movement instruction is input in the broadcast program selected in one of the first and second channel program guides, and one of broadcast programs of a decreased channel which are broadcasted in the same time zone as selected programs and the most overlapped broadcast program of the broadcast programs of the increased channel are displayed, if an downward movement instruction is input in the broadcast program selected in one of the first and second channel program guides.

26. The image display apparatus as claimed in claim 14, wherein the controller controls the OSD formation section so that a broadcast program located in a counter-clockwise direction of a selected broadcast program is displayed, if a left movement instruction is input in the broadcast program selected in one of the first and second channel program guides, and a broadcast program located in a clockwise direction of a selected broadcast program is displayed, if a right movement instruction is input in the broadcast program selected in one of the first and second channel program guides.

27. A non-transitory computer-readable recording medium storing a program comprising:
  a first set of instructions for forming a program guide screen comprising a program guide on at least a first channel surrounding an outer periphery of a program guide on at least a second channel according to formation information set for formation of the at least first and second program guides, an information portion comprising information on a selected program, a channel list comprising at least one channel corresponding to programs in the program guide; and
  a second set of instructions for displaying the formed program guide screen,
  wherein the information portion is displayed on a first area of the program guide screen distinct from the program guides,
  wherein the channel list is displayed on a second area of the program guide screen distinct from the program guide and the information portion.

28. A computer implemented method for providing program guides, comprising:
  forming a program guide screen comprising a program guide on at least a first channel surrounding an outer periphery of a program guide on at least a second channel according to formation information set for formation of the at least first and second program guides, an information portion comprising information on a selected program, a channel list comprising at least one channel corresponding to programs in the program guide; and
  displaying the formed program guide screen,
  wherein the information portion is displayed on a first area of the program guide screen distinct from the program guides,
  wherein the channel list is displayed on a second area of the program guide screen distinct from the program guide and the information portion.

\* \* \* \* \*